(12) United States Patent
Xu et al.

(10) Patent No.: US 12,266,765 B2
(45) Date of Patent: Apr. 1, 2025

(54) ELECTRODE ASSEMBLY, BATTERY CELL, BATTERY, AND MANUFACTURING METHOD AND DEVICE FOR ELECTRODE ASSEMBLY

(71) Applicant: JIANGSU CONTEMPORARY AMPEREX TECHNOLOGY LIMITED, Liyang (CN)

(72) Inventors: Hu Xu, Liyang (CN); Haizu Jin, Liyang (CN); Jiang Liu, Liyang (CN); Xing Li, Liyang (CN); Chengdu Liang, Liyang (CN); Yuqun Zeng, Liyang (CN)

(73) Assignee: JIANGSU CONTEMPORARY AMPEREX TECHNOLOGY LIMITED, Liyang (CN)

( * ) Notice: Subject to any disclaimer, the term of this patent is extended or adjusted under 35 U.S.C. 154(b) by 434 days.

(21) Appl. No.: 17/718,862

(22) Filed: Apr. 12, 2022

(65) Prior Publication Data
US 2022/0328884 A1 Oct. 13, 2022

Related U.S. Application Data

(63) Continuation of application No. PCT/CN2021/085850, filed on Apr. 7, 2021.

(51) Int. Cl.
*H01M 10/0587* (2010.01)
*H01M 10/04* (2006.01)

(52) U.S. Cl.
CPC ... *H01M 10/0587* (2013.01); *H01M 10/0431* (2013.01)

(58) Field of Classification Search
CPC ......... H01M 10/0431; H01M 10/0525; H01M 10/0587; H01M 10/4214; H01M 4/13; H01M 50/609
See application file for complete search history.

(56) References Cited

U.S. PATENT DOCUMENTS

| 6,284,404 | B1 | 9/2001 | Horie et al. |
| 2009/0208820 | A1* | 8/2009 | Nishino ............... H01M 50/342 429/56 |
| 2011/0281143 | A1 | 11/2011 | He et al. |

FOREIGN PATENT DOCUMENTS

| CN | 101867060 A | 10/2010 |
| CN | 104036968 A | 9/2014 |

(Continued)

OTHER PUBLICATIONS

Machine translation JP2006210031A (Year: 2006).*
Extended European Search Report dated Feb. 17, 2025 for European Application No. 21810259.8.

*Primary Examiner* — Victoria H Lynch
(74) *Attorney, Agent, or Firm* — Scully, Scott, Murphy & Presser, P.C.

(57) ABSTRACT

An embodiment of the present application provides an electrode assembly, a battery cell, a battery, and an electrode assembly manufacturing method and device, which belong to the technical field of batteries. The electrode assembly includes a positive electrode plate and a negative electrode plate, the positive electrode plate and the negative electrode plate being wound in a winding direction and forming a winding structure. The positive electrode plate comprises a plurality of first active substance layer regions and at least one first inactive substance layer region; and in an axial direction of the winding structure, the first inactive substance layer region is located between two adjacent first active substance layer regions, wherein, the first inactive substance layer region is provided with a first guide flow through hole, and the first guide flow through hole is configured to penetrate both sides in a thickness direction of the positive electrode plate.

16 Claims, 10 Drawing Sheets

(56) References Cited

FOREIGN PATENT DOCUMENTS

| | | |
|---|---|---|
| CN | 107689441 A | 2/2018 |
| CN | 208127332 U | 11/2018 |
| CN | 211957698 U | 11/2020 |
| JP | H10162801 A | 6/1998 |
| JP | 2006210031 A | 8/2006 |

* cited by examiner

ELECTRODE ASSEMBLY, BATTERY CELL, BATTERY, AND MANUFACTURING METHOD AND DEVICE FOR ELECTRODE ASSEMBLY

CROSS-REFERENCE TO RELATED APPLICATIONS

This application is a continuation of International Application No. PCT/CN2021/085850, filed on Apr. 7, 2021, the disclosure of which is hereby incorporated by reference in its entirety.

TECHNICAL FIELD

The present application relates to the technical field of batteries, and in particular, to an electrode assembly, a battery cell, a battery, and a manufacturing method and device for an electrode assembly.

BACKGROUND

A rechargeable battery, which can be referred to as a secondary battery, means a battery that can be used to activate an active substance by charging after the battery is discharged. The rechargeable battery is widely used in electronic devices, such as mobile phones, notebook computers, electromobiles, electric vehicles, electric airplanes, electric ships, electric toy cars, electric toy ships, electric toy airplanes, electric tools, or the like.

Lithium plating is a common abnormal phenomenon of lithium batteries. Lithium-ions that cannot be intercalated in the negative electrode can only gain electrons on a surface of the negative electrode due to abnormalities such as insufficient space for lithium to be intercalated in the negative electrode, excessive resistance to lithium-ion migration, or lithium-ions detaching from the positive electrode too quickly but not being able to be intercalated in the negative electrode in equal amounts, resulting in the formation of elementary substance lithium. The lithium plating can affect the charging efficiency and energy density of the lithium ions. When the lithium plating is serious, lithium crystals may also be formed, and the lithium crystals may pierce a separator and cause internal short-circuit thermal runaway, which seriously endangers the safety of the battery. Therefore, how to reduce the lithium plating is an urgent technical problem to be solved in the battery technology.

SUMMARY

An embodiment of the present application provide an electrode assembly, a battery cell, a battery, and a manufacturing method and device for an electrode assembly, which may effectively reduce the occurrence of the lithium plating phenomenon.

In a first aspect, an embodiment of the present application provides an electrode assembly, including a positive electrode plate and a negative electrode plate, the positive electrode plate and the negative electrode plate being wound along a winding direction to form a winding structure; the positive electrode plate including a plurality of first active substance layer regions and at least one first inactive substance layer region; in an axial direction of the winding structure, the first inactive substance layer region being located between two adjacent first active substance layer regions; where, the first inactive substance layer region is provided with a first guide flow through hole, and the first guide flow through hole is configured to penetrate both sides in a thickness direction of the positive electrode plate.

In the above solution, the first inactive substance layer region is provided on the positive electrode plate, which may reduce the amount of lithium ions deintercalated from the positive electrode plate during charging and reduce the occurrence of the lithium plating phenomenon. Since the first inactive substance layer region is provided with the first guide flow through hole configured to penetrate both sides in the thickness direction of the positive electrode plate, it facilitates flow of an electrolyte between the electrode plates, improves an infiltration effect of the electrolyte on the electrode assembly, and reduces the occurrence of the lithium plating phenomenon.

In some embodiments, the first inactive substance layer region is provided with a plurality of the first guide flow through holes distributed at intervals along the winding direction.

In the above solution, the first inactive substance layer region is provided with a plurality of the first guide flow through holes distributed at intervals along the winding direction. The electrolyte may flow between the electrode plates through a plurality of first guide flow through holes, which further improves the infiltration effect of the electrolyte on the electrode assembly.

In some embodiments, in the winding direction, a spacing between every two adjacent first guide flow through holes gradually increases; or, in the winding direction, the spacing between every two adjacent first guide flow through holes is equal.

In some embodiments, the negative electrode plate is provided with a second guide flow through hole, and the second guide flow through hole is configured to penetrate both sides in a thickness direction of the negative electrode plate.

In the above solution, the negative electrode plate is provided with the second guide flow through hole configured to penetrate both sides in a thickness direction of the negative electrode plate. The electrolyte may flow between the electrode plates through the first guide flow through hole, and may also flow between the electrodes plates through the second may flow through hole, which further improves the infiltration effect of the electrolyte on the electrode assembly.

In some embodiments, the negative electrode plate includes a second active substance layer region, the second guide flow through hole is provided in the second active substance layer region, and the first active substance layer region and the first inactive substance layer region are both provided opposite to the second active substance layer region.

In the above technical solution, the first active substance layer region and the first inactive substance layer region of the positive electrode plate are both provided opposite to the second active substance layer region of the negative electrode plate. That is, parts of the negative electrode plate opposite to the first active substance layer region and the first inactive substance layer region both have a negative active substance layer, which improves bending resistance of the electrode assembly in an area of the first inactive substance layer region.

In some embodiments, the negative electrode plate includes a plurality of second active substance layer regions and at least one second inactive substance layer region; and in the axial direction, the second inactive substance layer region is located between two adjacent second active substance layer regions, and the second guide flow through hole is provided in the second inactive substance layer region; where, the second active substance layer region is provided opposite to the first active substance layer region, the second inactive substance layer region is provided opposite to the first inactive substance layer region, and a width of the second inactive substance layer region in the axial direction does not exceed a width of the first inactive substance layer region in the axial direction.

In the above solution, the negative electrode plate is provided with the second inactive substance layer region, that is, the negative electrode plate is not provided with a negative active substance layer in this area, which may effectively reduce the production cost and has good economy. Since the first active substance layer region is provided opposite to the second active substance layer region, the first inactive substance layer region is provided opposite to the second inactive substance layer region, and the width of the second inactive substance layer region in the axial direction of the winding structure does not exceed the width of the first inactive substance layer region in the axial direction of the winding structure, which may effectively reduce the occurrence of the lithium plating phenomenon.

In some embodiments, the negative electrode plate is provided with a plurality of the second guide flow through holes distributed at intervals along the winding direction.

In the above solution, the negative electrode plate is provided with a plurality of the second guide flow through holes distributed at intervals along the winding direction. The electrolyte may flow between the electrode plates through a plurality of second guide flow through holes, which further improves the infiltration effect of the electrolyte on the electrode assembly.

In some embodiments, in the winding direction, a spacing between every two adjacent second guide flow through holes gradually increases; or, in the winding direction, the spacing between every two adjacent second guide flow through holes is equal.

In some embodiments, the winding structure is provided with a guide flow channel that allows an electrolyte to flow from the outside of the winding structure to the inside of the winding structure; and a plurality of the first guide flow through holes and a plurality of the second guide flow through holes form the guide flow channel.

In the above solution, a plurality of the first guide flow through holes and a plurality of the second guide flow through holes form the guide flow channel. The electrolyte outside the winding structure may enter the inside of the winding structure through the guide flow channel. Meanwhile, gases generated inside the electrode assembly may be discharged through the electrode assembly, which improves the exhaust effect of the electrode assembly and the infiltration effect of the electrolyte on the electrode assembly.

In some embodiments, the winding structure is provided with a plurality of the guide flow channels distributed at intervals along the winding direction.

In the above solution, the winding structure is provided with a plurality of the guide flow channels distributed at intervals along the winding direction. The electrolyte outside the winding structure may enter the inside of the electrode assembly from different directions through a plurality of guide flow channels. Gases generated inside the electrode assembly may also be exhausted from different directions through a plurality of guide flow channels, which further improves the exhaust effect of the electrode assembly and the infiltration effect of the electrolyte on the electrode assembly.

In some embodiments, the guide flow channel extends along a straight line, and an extension direction of the guide flow channel is provided at a non-zero angle with the axial direction.

In the above solution, the guide flow channel extends along a straight line, which improves smoothness of the electrolyte and gases flowing in the guide flow channel, and facilitates electrolyte infiltration and gas exhaust.

In some embodiments, the extension direction is perpendicular to the axial direction.

In the above solution, the extension direction of the guide flow channel is perpendicular to the axial direction, which may shorten the flow path of the electrolyte and the gases, and may effectively improve the electrolyte infiltration efficiency and the gas exhaust efficiency.

In some embodiments, the guide flow channel includes a plurality of flow through holes distributed at intervals along its extension direction, and the plurality of flow through holes includes a plurality of the first guide flow through holes and a plurality of the second guide flow through holes; in the direction in which the guide flow channel extends to the inside of the winding structure, an aperture of each guide flow through hole in the guide flow channel gradually reduces; or, the aperture of each guide flow through hole in the guide flow channel is equal.

In the above solution, if in the direction in which the guide flow channel extends to the inside of the winding structure, the aperture of each guide flow through hole in the guide flow channel gradually reduces, which may meet requirements that the electrode plate of the inner ring has a small infiltration requirement for the electrolyte and the electrode plate of the outer ring has a great requirement for the electrolyte. If the aperture of each guide flow through hole in the guide flow channel is equal, opening processes on the negative electrode plate and the positive electrode plate may be simplified.

In some embodiments, the winding structure includes an outer ring portion and an inner ring portion that are concentrically provided, and the inner ring portion is located inside the outer ring portion; the first guide flow through hole is provided in the positive electrode plate in the outer ring portion, the second guide flow through hole is provided in the negative electrode plate in the outer ring portion, and the guide flow channel is formed in the outer ring portion.

In the above solution, the guide flow channel is formed in the outer ring portion, and the electrolyte may enter the inside of the winding structure through the guide flow channel, to infiltrate the electrode plate in the outer ring portion. The first guide flow through hole and the second guide flow through hole are provided in the positive electrode plate and the negative electrode plate in the outer ring portion, respectively. The positive electrode plate in the inner ring portion is not provided with the first guide flow through hole, and the negative electrode plate in the inner ring portion is not provided with the second guide flow through hole, that is, the electrode plates in the inner ring portion are not punctured, which may effectively reduce the production cost and has better economy.

In some embodiments, the winding structure includes an outer ring portion and an inner ring portion that are concentrically provided, and the inner ring portion is located inside the outer ring portion; the positive electrode plates in the outer ring portion and the inner ring portion are both provided with the first guide flow through holes, and the negative electrode plates in the outer ring portion and the inner ring portion are both provided with the second guide flow through holes, the guide flow channel is formed in the outer ring portion and the inner ring portion; where, an aperture of the first guide flow through hole in the inner ring portion is smaller than an aperture of the first guide flow through hole in the outer ring portion, and an aperture of the second guide flow through hole in the inner ring portion is smaller than an aperture of the second guide flow through hole in the outer ring portion.

In the above solution, the aperture of the first guide flow through hole in the inner ring portion is smaller than the aperture of the first guide flow through hole in the outer ring portion, and the aperture of the second guide flow through hole in the inner ring portion is smaller than the aperture of the second guide flow through hole in the outer ring portion, so that the aperture of the guide flow through hole on the electrode plate in the outer ring portion is relatively large, and the guide flow through hole on the electrode plate in the inner ring portion is relatively small. The aperture of the guide flow through hole on the electrode plate in the outer ring portion is relatively large, so that the electrolyte outside the winding structure may quickly enter the electrode assembly through the guide flow through hole on the electrode plate in the outer ring portion; and the guide flow through hole on the electrode plate in the inner ring portion is relatively small, which facilitates providing the guide flow through hole on the electrode plate in the inner ring portion.

In some embodiments, the inside of the winding structure is formed with a central hole extending along the axial direction, and the guide flow channel is connected to the central hole.

In the above solution, the guide flow channel is connected with the central hole, and the electrolyte may enter the central position of the winding structure through the guide flow channel, which facilitates the infiltration of the electrolyte on the electrode plate of the innermost ring and facilitates the gas exhaust in the central hole.

In a second aspect, an embodiment of the present application provides a battery cell, including a shell and the electrode assembly according to any one of the embodiments of the first aspect; the electrode assembly being accommodated in the shell.

In a third aspect, an embodiment of the present application provides a battery, including a box body, and the battery cell according to any one of the embodiments of the second aspect; the battery cell being accommodated in the box body.

In a fourth aspect, an embodiment of the present application provides a power consumption device, including the battery according to any one of the embodiments of the third aspect.

In a fifth aspect, an embodiment of the present application provides a manufacturing method for an electrode assembly, including:

providing a positive electrode plate and a negative electrode plate; winding the negative electrode plate and the positive electrode plate along a winding direction to form a winding structure; where, the positive electrode plate including a plurality of first active substance layer regions and at least one first inactive substance layer region; in an axial direction of the winding structure, the first inactive substance layer region being located between two adjacent first active substance layer regions; the first inactive substance layer region is provided with a first guide flow through hole, and the first guide flow through hole is configured to penetrate both sides in a thickness direction of the positive electrode plate.

In a sixth aspect, an embodiment of the present application further provides a manufacturing device for an electrode assembly, including:

a providing apparatus, configured to provide a positive electrode plate and a negative electrode plate; and an assembly apparatus, configured to wind the negative electrode plate and the positive electrode plate along a winding direction to form a winding structure; where, the positive electrode plate including a plurality of first active substance layer regions and at least one first inactive substance layer region; in an axial direction of the winding structure, the first inactive substance layer region being located between two adjacent first active substance layer regions; the first inactive substance layer region is provided with a first guide flow through hole, and the first guide flow through hole is configured to penetrate both sides in a thickness direction of the positive electrode plate.

BRIEF DESCRIPTION OF DRAWINGS

In order to illustrate the technical solution in the embodiments of the present application more clearly, brief description will be made below to the drawings required in the embodiments of the present application, and apparently, the drawings described below are some embodiments of the present application only, and other drawings could be obtained based on these drawings by those ordinary skilled in this art without creative efforts.

Figure 1:
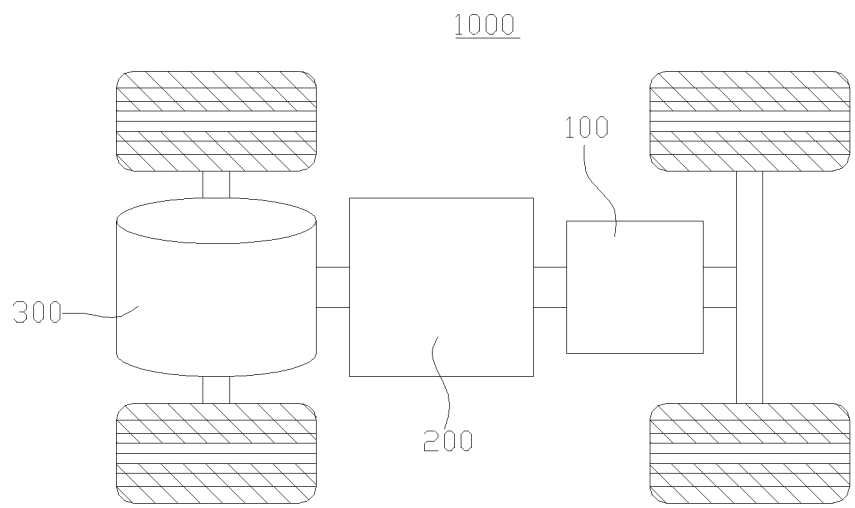
FIG. 1 is a schematic structural diagram of a vehicle provided by some embodiments of the present application.

In the drawings, the drawings are not drawn to actual scale.

Marking description: 10—box body; 11—first portion; 12—second portion; 13—accommodating space; 20—battery cell; 21—shell; 211—housing; 212—cover body; 213—sealing space; 22—electrode assembly; 221—positive electrode plate; 2211—positive electrode current collector; 2212—positive active substance layer; 2213—first active substance layer region; 2214—first inactive substance layer region; 2215—first guide flow through hole; 2216—first winding starting end; 2217—first winding finishing end; 222—negative electrode plate; 2221—negative electrode current collector; 2222—negative active substance layer; 2223—second guide flow through hole; 2224—second active substance layer region; 2225—second inactive substance layer region; 2226—second winding starting end; 2227—second winding finishing end; 223—separator; 224—guide flow channel; 225—central hole; 226—outer ring portion; 227—inner ring portion; 23—electrode terminal; 24—pressure relief mechanism; 100—battery; 200—controller; 300—motor; 1000—vehicle; 1100—providing apparatus; 1200—assembly apparatus; 2000—manufacturing device; A—winding direction; B—axial direction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. Those of ordinary skill in the art may appreciate the specific meanings of the foregoing terms in the present application according to specific circumstances.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent liquid or other foreign matters from affecting the charging or discharging of the battery cells.

The battery cells includes an electrode assembly and an electrolyte, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive active substance layer. The positive active substance layer is coated on a surface of the positive electrode current collector, and the positive electrode current collector not coated with the positive active substance layer protrudes from the positive electrode current collector coated with the positive active substance layer and is used as a positive electrode tab. As an example, in a lithium-ion battery, the material of the positive electrode current collector may be aluminum, and the positive active substance may be lithium cobalt oxides, lithium iron phosphate, ternary lithium or lithium manganate, etc. The negative electrode plate includes a negative electrode current collector and a negative active substance layer. The negative active substance layer is coated on a surface of the negative electrode current collector, and the negative electrode current collector not coated with the negative active substance layer protrudes from the negative electrode current collector coated with the negative active substance layer and is used as a negative electrode tab. A material of the negative electrode current collector may be copper, and the negative active substance may be carbon or silicon, etc. In order to ensure that no fusing occurs when a large current passes through, there are a plurality of positive electrode tabs which are stacked together, and there are a plurality of negative electrode tabs which are stacked together. A material of the separator may be polypropylene (PP) or polyethylene (PE), etc. In addition, the electrode assembly may be a winding structure or a laminated structure, and the embodiments of the present application are not limited thereto.

With the development of the battery technology, it is necessary to consider design factors in multiple aspects simultaneously, such as energy density, cycle life, discharge capacity, C-rate and other performance parameters. In addition, safety of the battery should also be considered. However, lithium plating is one of the factors that endanger the safety of the battery.

For lithium-ion batteries, during charging, lithium ions are deintercalated from the positive electrode and intercalated into the negative electrode; and during discharge, lithium ions are deintercalated from the negative electrode and intercalated into the positive electrode. When the lithium-ion batteries are charged, lithium plating may happen due to some abnormal situation, such as abnormalities such as insufficient space for lithium to be intercalated in the negative electrode, excessive resistance to lithium-ion migration, or lithium-ions detaching from the positive electrode too quickly but not being able to be intercalated in the negative electrode in equal amounts, resulting in lithium-ions cannot be intercalated in the negative electrode and can only gain electrons on a surface of the negative electrode so as to form the phenomenon of elementary substance lithium, that is, the lithium plating phenomenon.

The applicant found that in a battery cell, the electrolyte has a poor infiltration effect on the electrode assembly, resulting in insufficient electrolyte in some regions inside the electrode assembly, thereby causing lithium plating.

In view of this, an embodiment of the present application provides a technical solution. The first inactive substance layer region located between two first active substance layer regions in the positive electrode plate is provided with the guide flow through hole configured to penetrate both sides in the thickness direction of the positive electrode plate, which facilitates flow of the electrolyte between the electrode plates, improves an infiltration effect of the electrolyte on the electrode assembly, and reduces the occurrence of the lithium plating phenomenon.

The technical solution described in the embodiment of the present application is applicable to a battery and a power consumption device using the battery.

The power consumption device may be vehicles, mobile phones, portable devices, notebook computers, ships, spacecraft, electric toys, electric tools, etc. The vehicle may be fuel vehicles, gas vehicles or new energy vehicles; new energy vehicles may be pure electric vehicles, hybrid vehicles or extended range vehicles, etc; the spacecrafts include airplanes, rockets, space shuttles and spaceships, etc.; the electric toys include fixed or mobile electric toys, such as game consoles, electric vehicle toys, electric ship toys and electric airplane toys, etc.; the electric tools include metal cutting power tools, grinding power tools, assembly power tools and railway power tools, such as electric drills, electric grinders, electric wrenches, electric screwdrivers, electric hammers, impact drills, concrete vibrators, and electric planers, etc. The embodiment of the present application does not impose special restrictions on the above power consumption device.

For the convenience of description, the following embodiments take a vehicle as an example of the power consumption device for description.

Please refer to FIG. 1. FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 may further include a controller 200 and a motor 300. The controller 200 is used to control the battery 100 to supply power to the motor 300, for example, for starting, navigating, and working power requirements during driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
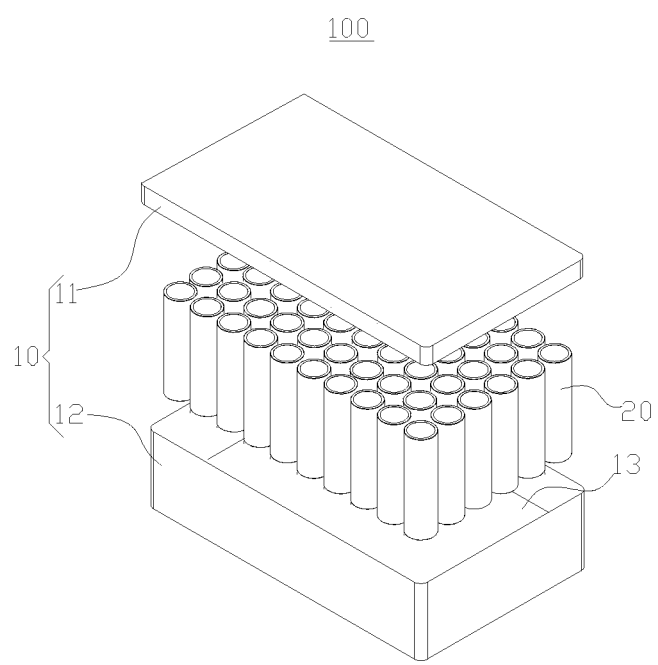
FIG. 2 is an exploded view of a battery provided by some embodiments of the present application.

Please refer to FIG. 2. FIG. 2 is an exploded view of a battery 100 provided by some embodiments of the present application. The battery 100 includes a box body 10 and a battery cell 20, and the battery cell 20 is accommodated in the box body 10.

The box body 10 is used for accommodating the battery cell 20, and the box body 10 may have various structures. In some embodiments, the box body 10 may include a first portion 11 and a second portion 12, the first portion 11 and the second portion 12 are mutually covered, and the first portion 11 and the second portion 12 together define an accommodating space 13 for accommodating the battery cell 20. The second portion 12 may be a hollow structure with one end open, the first portion 11 is a plate-like structure, and the first portion 11 covers the opening side of the second portion 12 to form a box body 10 with the accommodating space 13; and the first portion 11 and the second portion 12 may also be a hollow structure with one side open, and the opening side of the first portion 11 covers the opening side of the second portion 12 to form a box body 10 with the accommodating space 13. Of course, the first portion 11 and the second portion 12 may have various shapes, such as a cylinder, a cuboid, etc.

In order to improve the sealing performance after the first portion 11 and the second portion 12 are connected, a sealing element (not shown in the figure), such as a sealant, a sealing ring, etc., may also be provided between the first portion 11 and the second portion 12.

In the battery 100, there may be one or more battery cells 20. If there are a plurality of battery cells 20, a plurality of battery cells 20 may be connected in series or in parallel or in hybrid. The hybrid connection means that a plurality of battery cells 20 are both connected in series and in parallel. The battery cell 20 may be in the shape of a cylinder, a cuboid, or in other shapes. In FIG. 2, illustratively, the battery cell 20 is cylindrical.

A plurality of battery cells 20 may be directly connected in series or in parallel or in hybrid, and then a whole formed by a plurality of battery cells 20 may be accommodated in the box body 10. A plurality of battery cells 20 may also be first connected in series, in parallel or in series and parallel to form a battery module, and then a plurality of battery modules are connected in series, in parallel or in series and parallel to form a whole and are accommodated in the box body 10.

A plurality of battery cells 20 may be electrically connected through a bus component (not shown in the figure) to realize the connection of a plurality of battery cells 20 in series, or in parallel or in hybrid.

Figure 3:
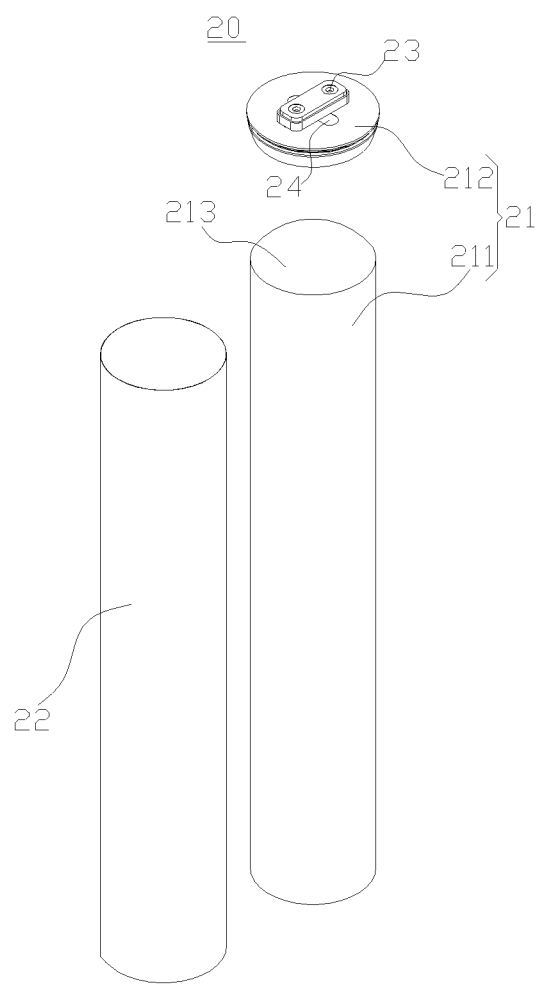
FIG. 3 is an exploded view of the battery cell shown in FIG. 2.

Please refer to FIG. 3. FIG. 3 is an exploded view of the battery cell 20 shown in FIG. 2. The battery cell 20 includes a shell 21 and an electrode assembly 22, and the electrode assembly 22 is accommodated in the shell 21.

In some embodiments, the shell 21 may also be used to accommodate an electrolyte, such as an electrolyte. The shell 21 may have various structural forms.

In some embodiments, the shell 21 may include a housing 211 and a cover body 212. The housing 211 is a hollow structure with one side open. The cover body 212 covers the opening of the housing 211 and forms a sealed connection to form a sealing space 213 for accommodating the electrode assembly 22 and the electrolyte.

When the battery cell 20 is assembled, the electrode assembly 22 may be first put into the housing 211, the housing 211 is filled with the electrolyte, and then the cover body 212 covers the opening of the housing 211.

The housing 211 may have various shapes, such as a cylinder, a cuboid, etc. The shape of the housing 211 may be determined according to a specific shape of the electrode assembly 22. For example, if the electrode assembly 22 has a cylindrical structure, a cylindrical housing may be selected; and if the electrode assembly 22 has a cuboid structure, a cuboid housing may be selected. Of course, the cover body 212 may also have various structures, for example, the cover body 212 has a plate-shaped structure, a hollow structure with one end open, etc. Illustratively, in FIG. 3, the housing 211 has a cylindrical structure, the cover body 212 has a plate-shaped structure, and the electrode assembly 22 has a cylindrical structure. The electrode assembly 22 is accommodated in the housing 211, and the cover body 212 covers the opening at the top of the housing 211.

In some embodiments, the battery cell 20 may further include an electrode terminal 23, and the electrode terminal 23 may be mounted on the cover body 212. The electrode terminal 23 and the electrode assembly 22 are electrically connected, to output electric energy generated by the battery cell 20. Illustratively, the electrode terminal 23 and the electrode assembly 22 may be electrically connected through an adapting sheet (not shown in the figure).

In some embodiments, the battery cell 20 may also include a pressure relief mechanism 24. The pressure relief mechanism 24 may be used for relieving an internal pressure of the battery cell 20 when the internal pressure or temperature of the battery cell 20 reaches a predetermined value.

Illustratively, the pressure relief mechanism 24 may be a component such as an explosion-proof valve, a rupture disk, a gas valve, a pressure relief valve, or a safety valve.

Next, the specific structure of the electrode assembly 22 will be described in detail with reference to the drawings.

Figure 4:
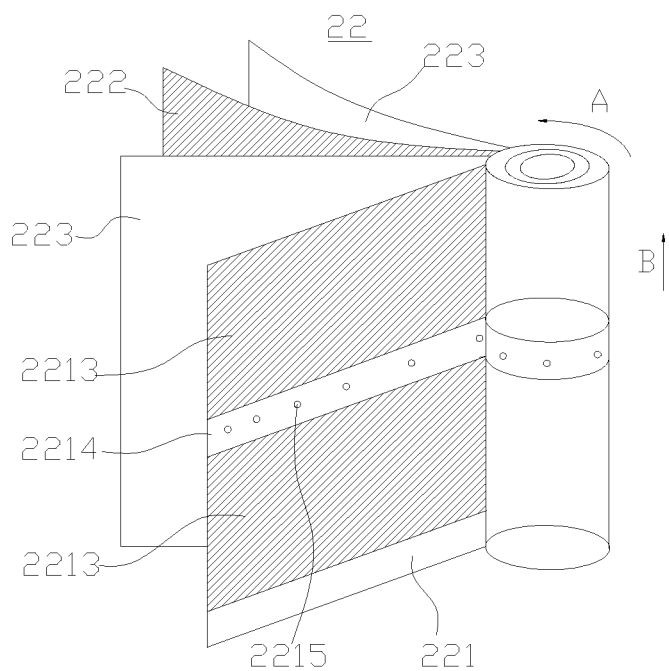
FIG. 4 is a schematic winding diagram of an electrode assembly provided by some embodiments of the present application.

Please refer to FIG. 4. FIG. 4 is a schematic winding diagram of an electrode assembly 22 provided by some embodiments of the present application. The electrode assembly 22 includes a positive electrode plate 221 and a negative electrode plate 222. The positive electrode plate 221 and the negative electrode plate 222 are wound along a winding direction A to form a winding structure.

Among that, the positive electrode plate 221 and the negative electrode plate 222 are stacked in the thickness direction of the positive electrode plate 221. The winding direction A is the direction in which the positive electrode plate 221 and the negative electrode plate 222 are wound from the inside to the outside.

The winding structure may be cylindrical or flat. In FIG. 4, illustratively, the winding structure is cylindrical.

In some embodiments, the positive electrode plate 221 includes a positive electrode current collector 2211 (not shown in FIG. 4) and positive active substance layers 2212 (not shown in FIG. 4) provided on both sides in a thickness direction of the positive electrode current collector 2211. The negative electrode plate 222 includes a negative electrode current collector 2221 (not shown in FIG. 4) and a negative active substance layer 2222 (not shown in FIG. 4) provided on both sides in a thickness direction of the negative electrode current collector 2221.

In some embodiments, the electrode assembly 22 may further include a separator 223, the separator 223 is used to separate the positive electrode plate 221 and the negative electrode plate 222, so as to reduce the risk of a short circuit between the positive electrode plate 221 and the negative electrode plate 222.

The separator 223 has a large number of penetrating micropores, which may ensure the free passage of electrolyte ions and has good penetration of lithium ions. A material of the separator 223 may be polypropylene (PP) or polyethylene (PE), etc.

In the case where the electrode assembly 22 includes the separator 223, the positive electrode plate 221, the separator 223 and the negative electrode plate 222 may be first stacked together, and then wound as a whole along the winding direction A to form a winding structure.

In some embodiments, the positive electrode plate 221 includes a plurality of first active substance layer regions 2213 and at least one first inactive substance layer region 2214; and in an axial direction B of the winding structure, the first inactive substance layer region 2214 is located between two adjacent first active substance layer regions 2213. The first inactive substance layer region 2214 is provided with a first guide flow through hole 2215, and the first guide flow through hole 2215 is configured to penetrate both sides in a thickness direction of the positive electrode plate 221. The axial direction B of the winding structure referred to here is an arrangement direction of an axis of the winding structure, and may also be understood as a width direction of the positive electrode plate 221.

In the above structure, since the first inactive substance layer region 2214 is provided on the positive electrode plate 221, which may reduce the number of lithium ions deintercalated from the positive electrode plate 221 during charging and reduce the occurrence of lithium plating phenomenon. Since the first inactive substance layer region 2214 is provided with the first guide flow through hole 2215 configured to penetrate both sides in the thickness direction of the positive electrode plate 221, it facilitates flow of an electrolyte between the electrode plates, improves an infiltration effect of the electrolyte on the electrode assembly 22, and reduces occurrence of lithium plating phenomenon.

In the electrode assembly 22, the electrolyte generally enters the electrode assembly 22 from both ends in the axial direction B of the winding structure. However, since a gap between the electrode plates may occur irregularities, some gaps are large, and some gaps are small; and if the gap between the electrode plates is relatively small, it is difficult for the electrolyte to infiltrate the electrode plate. Since the first inactive substance layer region 2214 of the positive electrode plate 221 is provided with a first guide flow through hole 2215, the electrolyte may flow between the electrode plates. After the electrolyte enters the large gap between the electrode plate and the electrode plate from both ends in the axial direction B of the winding structure, the electrolyte may enter the small gap between the electrode plate and the electrode plate through the first guide flow through hole 2215 to infiltrate the electrode plate and reduce lithium plating.

Taking any three rings of electrode plates in the winding structure as an example. The three rings of electrode plates include a first ring of electrode plate, a second ring of electrode plate and a third ring of electrode plate, respectively. The first ring of electrode plate, the second ring of electrode plate and the third ring of electrode plate are provided in order from the inside to the outside. The first ring of electrode plate and the third ring of electrode plate are negative electrode plates 222, and the second ring of electrode plate is a positive electrode plate 221. A gap between the first ring of electrode plate and the second ring of electrode plate is relatively small, and a gap between the second ring of electrode plate and the third ring of electrode plate is relatively large. Since the gap between the first ring of electrode plate and the second ring of electrode plate is relatively small, it is difficult for the electrolyte to enter between the first ring of electrode plate and the second ring of electrode plate from the two ends in the axial direction B of the winding structure.

However, the electrolyte may first enter between the second ring of electrode plate and the third ring of electrode plate from the two ends in the axial direction B of the winding structure, and then enter between the first ring of electrode plate and the second ring of electrode plate through the first guide flow through hole 2215 on the second ring of electrode plate, to improve the effect of electrolyte infiltration.

It should be noted that the first active substance layer region 2213 of the positive electrode plate 221 is a part of the positive electrode plate 221 provided with the positive active substance layer 2212, and the first inactive substance layer region 2214 of the positive electrode plate 221 is a part of the positive electrode plate 221 not provided with the positive active substance layer 2212. That is, a thickness of a part of the positive electrode plate 221 located in the first active substance layer region 2213 is greater than a thickness of the positive electrode plate 221 located in the first inactive substance layer region 2214, increasing a distance between a part of the positive electrode plate 221 located in the first inactive substance layer region 2214 and the negative electrode plate 222, which facilitates the electrolyte to enter the first guide flow through hole 2215.

In the axial direction B of the winding structure, the first active substance layer region 2213 in the positive electrode plate 221 may be two, three, etc. that are distributed at intervals. In FIG. 4, illustratively, there are two first active substance layer regions 2213 in the positive electrode plate 221, and a first inactive substance layer region 2214 is provided between the two first active substance layer regions 2213.

Figure 5:
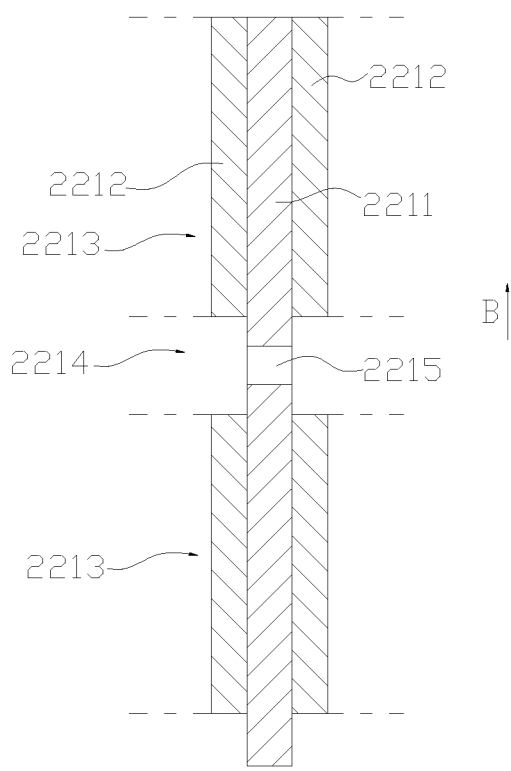
FIG. 5 is a cross-sectional view of a positive electrode plate provided by some embodiments of the present application.

Please refer to FIG. 5. FIG. 5 is a cross-sectional view of a positive electrode plate 221 provided by some embodiments of the present application. Since the positive active substance layer 2212 is not provided in the first inactive substance layer region 2214 of the positive electrode plate 221, the first guide flow through hole 2215 penetrates both sides in the thickness direction of the positive electrode plate 221. It is understandable that the first guide flow through hole 2215 penetrates both sides of in the thickness direction of the positive electrode current collector 2211 of the positive electrode plate 221.

The first guide flow through hole 2215 may have various shapes, such as a circular, an ellipse, a cuboid, a trapezoid, etc.

In the positive electrode plate 221, there may be one or more first guide flow through holes 2215, and the specific number of the first guide flow through holes 2215 may be set according to specific requirements.

In some embodiments, the first inactive substance layer region 2214 is provided with a plurality of the first guide flow through holes 2215 distributed at intervals along the winding direction A (refer to FIG. 4). The electrolyte may flow between the electrode plates through a plurality of first guide flow through holes 2215, which further improves the infiltration effect of the electrolyte on the electrode assembly 22.

Figure 6:
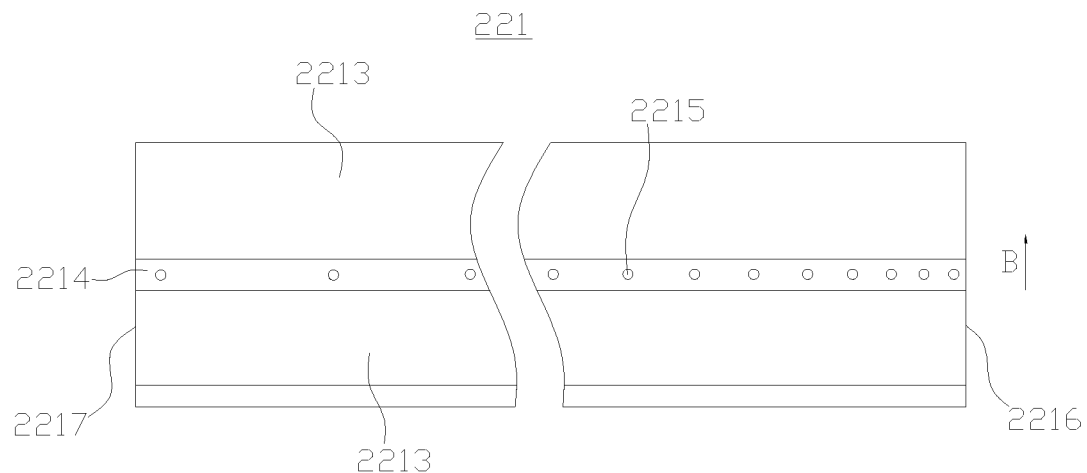
FIG. 6 is a schematic structural diagram of a positive electrode plate after expansion provided by some embodiments of the present application.

Please refer to FIG. 6. FIG. 6 is a schematic structural diagram of a positive electrode plate 221 after expansion provided by some embodiments of the present application. The positive electrode plate 221 has two ends, which are a first winding starting end 2216 and a first winding finishing end 2217, respectively. After the positive electrode plate 221 is formed by winding, the first winding starting end 2216 is closer to the central position of the winding structure than the first winding finishing end 2217. A plurality of first guide flow through holes 2215 are distributed at intervals along the winding direction A (refer to FIG. 4) in the first inactive substance layer region 2214. It is understandable that when the positive electrode plate 221 is expanded (the positive electrode plate 221 is in a straight state), a plurality of first guide flow through holes 2215 are distributed at intervals in the first inactive substance layer region 2214 along the direction that the first winding starting end 2216 of the positive electrode plate 221 points to the first winding finishing end 2217.

In some embodiments, please continue to refer to FIG. 6. In the winding direction A (refer to FIG. 4), a spacing between every two adjacent first guide flow through holes 2215 gradually increases. It is understandable that when the positive electrode plate 221 is expanded, in the direction that the first winding starting end 2216 of the positive electrode plate 221 points to the first winding finishing end 2217, the spacing of every two adjacent first guide flow through holes 2215 gradually increases.

Figure 7:
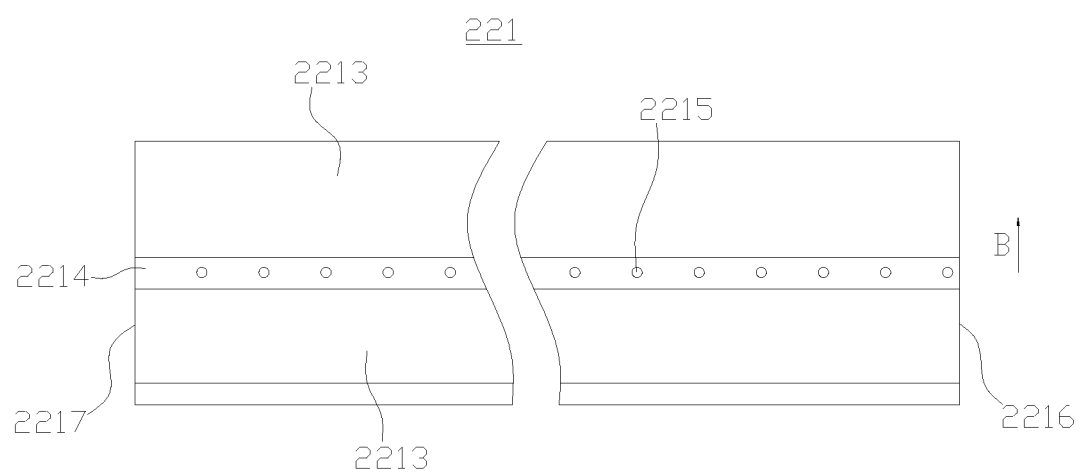
FIG. 7 is a schematic structural diagram of a positive electrode plate after expansion provided by some other embodiments of the present application.

In some other embodiments, please refer to FIG. 7. FIG. 7 is a schematic structural diagram of a positive electrode plate 221 after expansion provided by some other embodiments of the present application. In the winding direction A, the spacing of every two adjacent first guide flow through holes 2215 is equal. It is understandable that when the positive electrode plate 221 is expanded, in the direction that the first winding starting end 2216 of the positive electrode plate 221 points to the first winding finishing end 2217, the spacing of every two adjacent first guide flow through holes 2215 is equal, that is, the first guide flow through holes 2215 are evenly distributed on the positive electrode plate 221.

Figure 8:
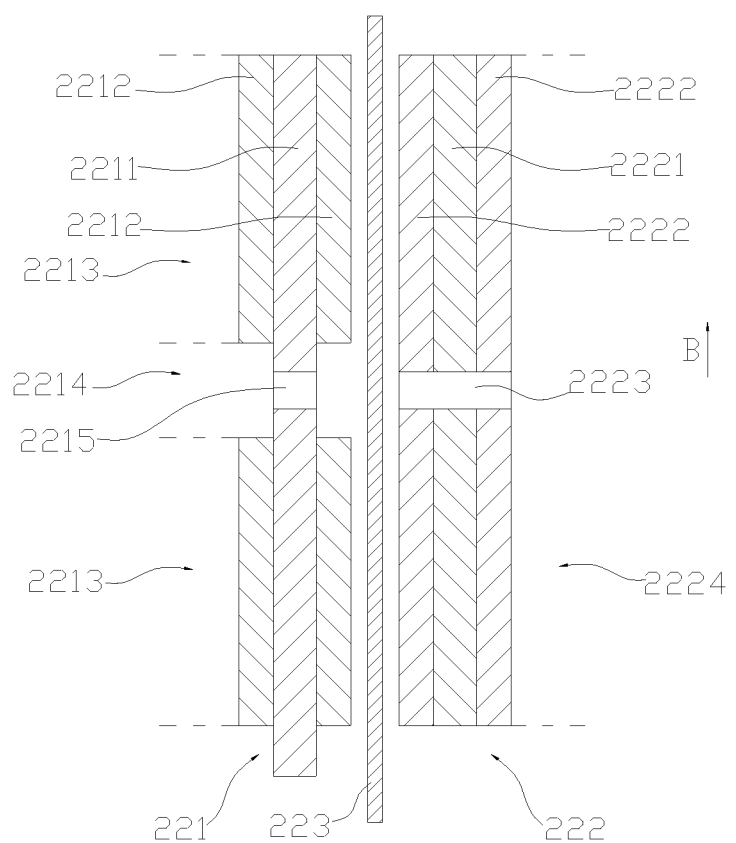
FIG. 8 is a positional relationship diagram of a positive electrode plate, a separator and a negative electrode plate provided by some embodiments of the application.

In some embodiments, please refer to FIG. 8. FIG. 8 is a diagram of the positional relationship of a positive electrode plate 221, a separator 223 and a negative electrode plate 222 provided by some embodiments of the application. The negative electrode plate 222 may be provided with a second guide flow through hole 2223, and the second guide flow through hole 2223 is configured to penetrate both sides in a thickness direction of the negative electrode plate 222. That is, the electrolyte may flow between the electrode plates through the first guide flow through hole 2215 on the positive electrode plate 221, and also may flow between the electrode plates through the second guide flow through hole 2223 on the negative electrode plate 222 to further improve the infiltration effect of the electrolyte on the electrode assembly 22.

The second guide flow through hole 2223 may have various shapes, such as a circular, an ellipse, a cuboid, a trapezoid, etc. A size of the second guide flow through hole 2223 and a size of the first guide flow through hole 2215 may be equal, or may be different.

In some embodiments, please continue to refer to FIG. 8. The negative electrode plate 222 includes a second active substance layer region 2224, the second guide flow through hole 2223 is provided in the second active substance layer region 2224, and the first active substance layer region 2213 and the first inactive substance layer region 2214 of the positive electrode plate 221 are both provided opposite to the second active substance layer region 2224.

The second active substance layer region 2224 is a part of the negative electrode plate 222 provided with the negative active substance layer 2222. That is, parts of the negative electrode plate 222 opposite to the first active substance layer region 2213 and the first inactive substance layer region 2214 both have the negative active substance layer 2222, which improves bending resistance of the electrode assembly 22 in an area of the first inactive substance layer region 2214.

Among that, the second guide flow through hole 2223 penetrates the negative electrode current collector 2221 of the negative electrode plate 222 and the negative active substance layer 2222.

Figure 9:
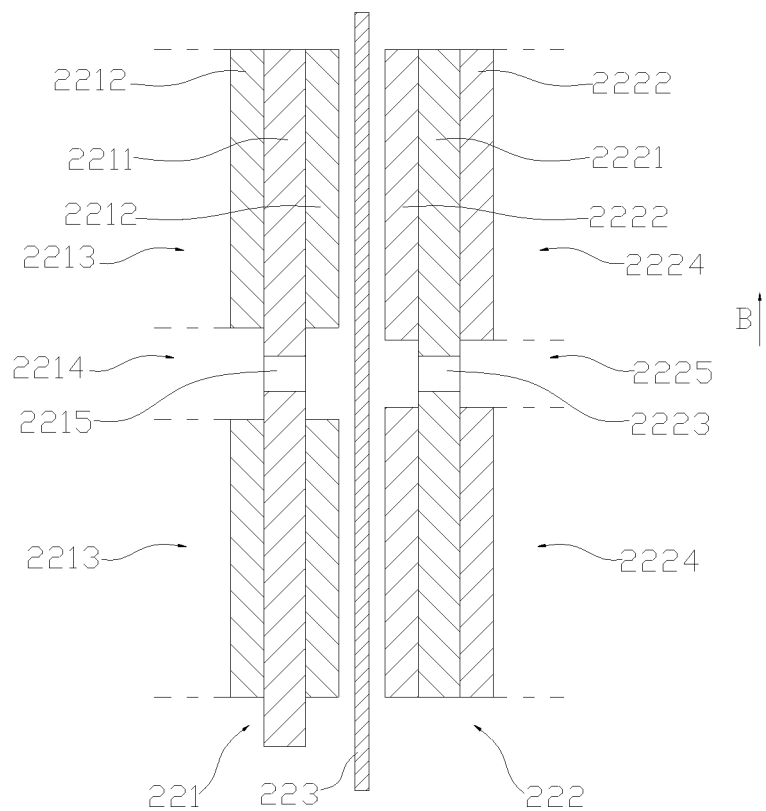
FIG. 9 is a positional relationship diagram of a positive electrode plate, a separator and a negative electrode plate provided by some other embodiments of the application.

In some embodiments, please refer to FIG. 9. FIG. 9 is a diagram of the positional relationship of a positive electrode plate 221, a separator 223 and the negative electrode plate 222 provided by some other embodiments of the application. The negative electrode plate 222 includes a plurality of second active substance layer regions 2224 and at least one second inactive substance layer region 2225; and in an axial direction B of the winding structure, the second inactive substance layer region 2225 is located between two adjacent second active substance layer regions 2224, and the second guide flow through hole 2223 is provided on the second inactive substance layer region 2225.

Among that, the second active substance layer region 2224 is provided opposite to the first active substance layer region 2213, the second inactive substance layer region 2225 is provided opposite to the first inactive substance layer region 2214, and a width of the second inactive substance layer region 2225 in the axial direction B of the winding structure does not exceed a width of the first inactive substance layer region 2214 in the axial direction B of the winding structure.

The negative electrode plate 222 is provided with the second inactive substance layer region 2225, that is, the negative electrode plate 222 is not provided with the negative active substance layer 2222 in this area, which may effectively reduce the production cost and has good economy. Since the first active substance layer region 2213 is provided opposite to the second active substance layer region 2224, the first inactive substance layer region 2214 is provided opposite to the second inactive substance layer region 2225, and a width of the second inactive substance layer region 2225 in the axial direction B of the winding structure does not exceed a width of the first inactive substance layer region 2214 in the axial direction B of the winding structure, which ensures that lithium ions during charging are deintercalated from the positive electrode plate 221 and intercalated into the negative electrode plate 222, and during discharge deintercalated from the negative electrode plate 222 and intercalated into the positive electrode plate 221 in the same amount, to reduce the occurrence of lithium plating phenomenon.

Illustratively, in FIG. 9, a width of the second inactive substance layer region 2225 in the axial direction B of the winding structure is smaller than a width of the first inactive substance layer region 2214 in the axial direction B of the winding structure.

The second active substance layer region 2224 of the negative electrode plate 222 is a part of the negative electrode plate 222 provided with the negative active substance layer 2222, and the second inactive substance layer region 2225 of the negative electrode plate 222 is a part of the negative electrode plate 222 not provided with the negative active substance layer 2222. That is, a thickness of a part of the negative electrode plate 222 located in the second active substance layer region 2224 is greater than a thickness of the negative electrode plate 222 located in the second inactive substance layer region 2225, increasing a distance between a part of the negative electrode plate 222 located in the second inactive substance layer region 2225 and a part of the positive electrode plate 221 located in the first inactive substance layer region 2214, which facilitates the electrolyte to enter the second guide flow through hole 2223.

In the axial direction B of the winding structure, the second active substance layer regions 2224 in the negative electrode plate 222 may be two or three that are distributed at intervals. The second active substance layer region 2224 in the negative electrode plate 222 may be in one-to-one correspondence with the first active substance layer region 2213 in the positive electrode plate 221. In FIG. 9, illustratively, there are two first active substance layer regions 2213 in the positive electrode plate 221; one first inactive substance layer region 2214 is provided between the two first active substance layer regions 2213; there are also two second active substance layer region 2224 in the negative electrode plate 222; and one second inactive substance layer region 2225 is provided between the two second active substance layer regions 2224.

In the present embodiment, since the second inactive substance layer region 2225 of the negative electrode plate 222 is not provided with the negative active substance layer 2222, and the second guide flow through hole 2223 penetrates both sides in a thickness direction of the negative electrode plate 222. It is understandable that the second guide flow through hole 2223 penetrates both sides in a thickness direction of the negative electrode current collector 2221 of the negative electrode plate 222.

In the negative electrode plate 222, there may be one or more second guide flow through holes 2223, and the specific number of the second guide flow through holes 2223 may be set according to specific requirements.

In some embodiments, the negative electrode plate 222 is provided with a plurality of the second guide flow through holes 2223 distributed at intervals along the winding direction A (refer to FIG. 4). The electrolyte may flow between the electrode plates through a plurality of second guide flow through holes 2223, which further improves the infiltration effect of the electrolyte on the electrode assembly 22.

Figure 10:
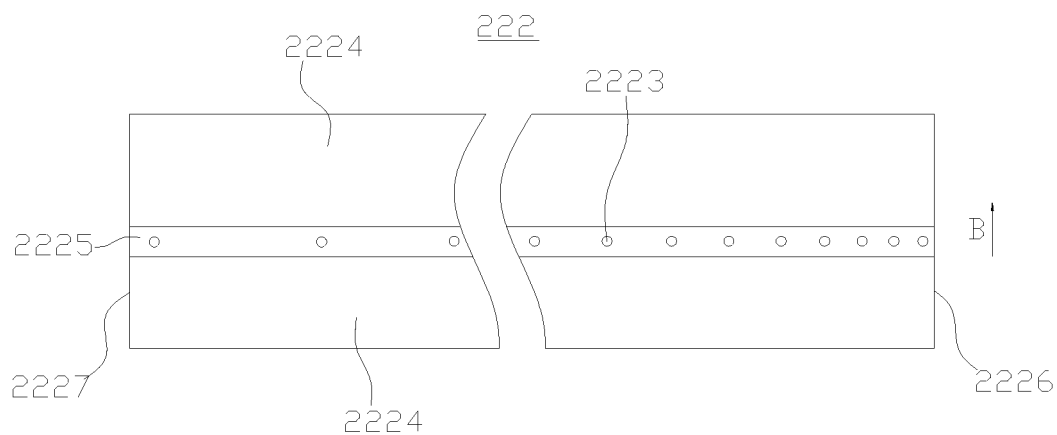
FIG. 10 is a schematic structural diagram of a negative electrode plate after expansion provided by some embodiments of the present application.

Please refer to FIG. 10. FIG. 10 is a schematic structural diagram of a negative electrode plate 222 after expansion provided by some embodiments of the present application. The negative electrode plate 222 has two ends, which are a second winding starting end 2226 and a second winding finishing end 2227, respectively. After the negative electrode plate 222 is formed by winding, the second winding starting end 2226 is closer to the central position of the winding structure than the second winding finishing end 2227. A plurality of second guide flow through holes 2223 are distributed at intervals along the winding direction A (refer to FIG. 4) in the negative electrode plate 222. It is understandable that when the negative electrode plate 222 is expanded (the negative electrode plate 222 is in a straight state), a plurality of second guide flow through holes 2223 are distributed at intervals in the negative electrode plate 222 along the direction that the second winding starting end 2226 of the negative electrode plate 222 points to the second winding finishing end 2227.

In some embodiments, please continue to refer to FIG. 10. In the winding direction A (refer to FIG. 4), a spacing between every two adjacent second guide flow through holes 2223 gradually increases. It is understandable that when the negative electrode plate 222 is expanded, in the direction that the second winding starting end 2226 of the negative electrode plate 222 points to the second winding finishing end 2227, the spacing of every two adjacent second guide flow through holes 2223 gradually increases.

Figure 11:
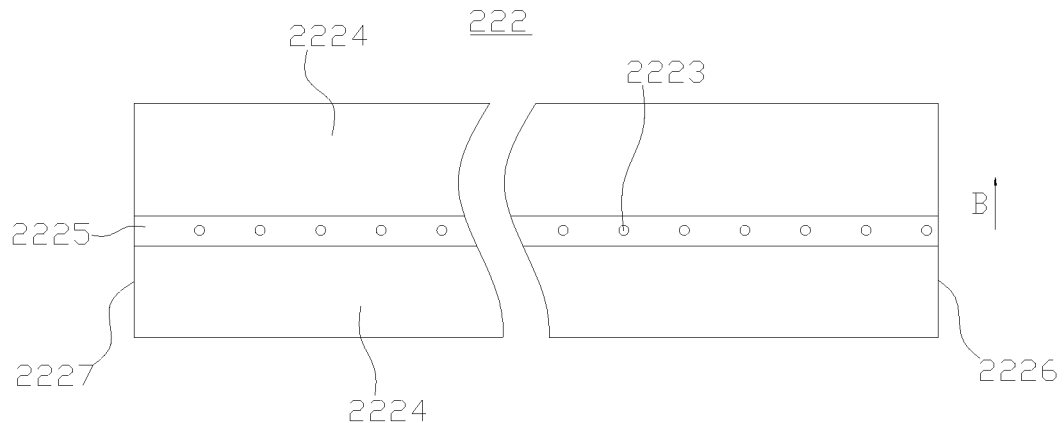
FIG. 11 is a schematic structural diagram of a negative electrode plate after expansion provided by some other embodiments of the present application.

In some other embodiments, please refer to FIG. 11. FIG. 11 is a schematic structural diagram of a negative electrode plate 222 after expansion provided by some other embodiments of the present application. In the winding direction A, the spacing of every two adjacent second guide flow through holes 2223 is equal. It is understandable that when the negative electrode plate 222 is expanded, in the direction that the second winding starting end 2226 of the negative electrode plate 222 points to the second winding finishing end 2227, the spacing of every two adjacent second guide flow through holes 2223 is equal, that is, the second guide flow through holes 2223 are evenly distributed on the negative electrode plate 222.

It should be noted that, in the embodiment of the present application, regardless of whether the negative electrode plate 222 is provided with the second active substance layer region 2224, the second guide flow through hole 2223 on the negative electrode plate 222 is all arranged in the above equal spacing or variable spacing.

Figure 12:
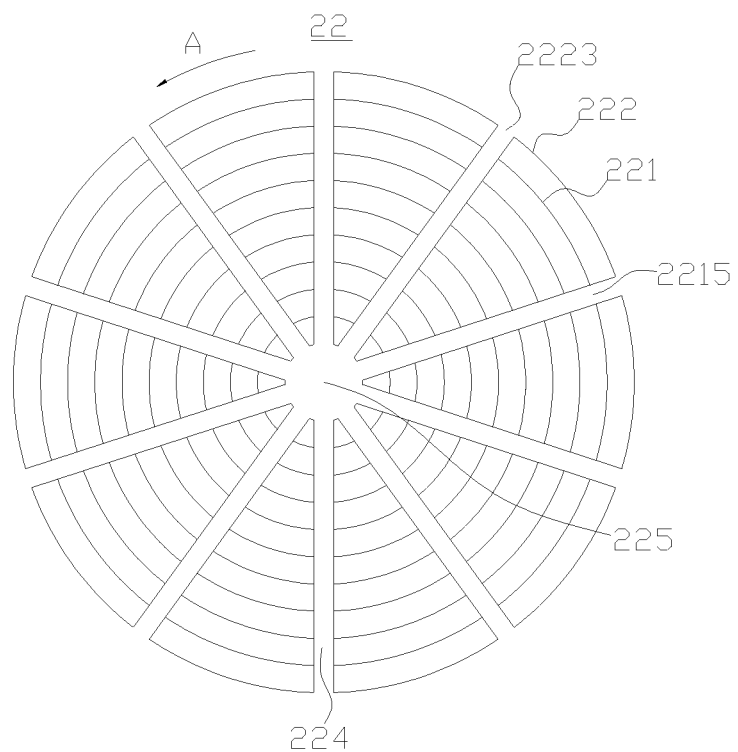
FIG. 12 is a schematic structural diagram of an electrode assembly provided by some embodiments of the present application.

In some embodiments, please refer to FIG. 12. FIG. 12 is a schematic structural diagram of an electrode assembly 22 provided by some embodiments of the present application. The winding structure is provided with a guide flow channel 224 that allows an electrolyte to flow from the outside of the winding structure to the inside of the winding structure; and a plurality of the first guide flow through holes 2215 and a plurality of the second guide flow through holes 2223 form the guide flow channel 224. The electrolyte outside the winding structure may enter the inside of the winding structure through the guide flow channel 224. Meanwhile, gases generated inside the electrode assembly 22 may be exhausted through the electrode assembly 22, which improves the exhaust effect of the electrode assembly 22 and the infiltration effect of the electrolyte on the electrode assembly 22.

Among that, an outer end of the guide flow channel 224 penetrates the electrode plate of the outermost ring in the winding structure. If the electrode plate of the outermost ring in the winding structure is the positive electrode plate 221, the electrode plate of the outermost ring in the winding structure is provided with a first guide flow through hole 2215, and the first guide flow through hole 2215 is a part of the guide flow channel 224. If the electrode plate of the outermost ring in the winding structure is the negative electrode plate 222, the electrode plate of the outermost ring in the winding structure is provided with a second guide flow through hole 2223, and the second guide flow through hole 2223 is a part of the guide flow channel 224. Illustratively, in FIG. 12, the electrode plate of the outermost ring in the winding structure is the negative electrode plate 222.

In the case where a central hole 225 extending along the axial direction B of the winding structure is formed inside the winding structure, the guide flow channel 224 may connect with the central hole 225, that is, an inner end of the guide flow channel 224 penetrates through the electrode plate of the innermost ring of the winding structure, which facilitates the electrolyte infiltration on the electrode plate of the innermost ring, and facilitates gas exhaust in the central hole 225.

Of course, the guide flow channel 224 may not connect with the central hole 225 either. For example, the first guide flow through hole 2215 is only provided on the positive electrode plates 221 of outermost rings of the winding structure, and the second guide flow through hole 2223 is only provided on the negative electrode plates 222 of the outermost rings of the winding structure, so that the guide flow channel 224 formed by the first guide flow through hole 2215 and the second guide flow through hole 2223 does not extend to the electrode plates of innermost rings winding structure.

In the guide flow channel 224, a shape of the first guide flow through hole 2215 and a shape of the second guide flow through hole 2223 may be the same, or may be different. A size of the first guide flow through hole 2215 and a size of the second guide flow through hole 2223 may be equal, or may be different. Illustratively, in FIG. 12, the first guide flow through hole 2215 and the second guide flow through hole 2223 are both circular, and an aperture of the first guide flow through hole 2215 and an aperture of the second guide flow through hole 2223 are equal.

There may be one or more guide flow channels 224 in the winding structure, and the specific number of the guide flow channels 224 may be set according to specific requirements. In some embodiments, the winding structure is provided with a plurality of the guide flow channels 224 distributed at intervals along the winding direction A, that is, a plurality of guide flow channels 224 are circumferentially distributed at intervals along the winding structure.

The electrolyte outside the winding structure may enter the inside of the electrode assembly 22 from different directions through a plurality of guide flow channels 224. Gases generated inside the electrode assembly 22 may also be exhausted from different directions through a plurality of guide flow channels 224, which further improves the exhaust effect of the electrode assembly 22 and the infiltration effect of the electrolyte on the electrode assembly 22.

Illustratively, the electrode assembly 22 has a cylindrical winding structure.

In some embodiments, the guide flow channel 224 extends along a straight line, and an extension direction of the guide flow channel 224 is provided at a non-zero angle with the axial direction B. This structure improves smoothness of the electrolyte and gases flowing in the guide flow channel 224, and facilitates electrolyte infiltration and gas exhaust.

The guide flow channel 224 extends along a straight line, that is, each first guide flow through hole 2215 and each second guide flow through hole 2223 in the guide flow channel 224 are located on the same straight line. In other embodiments, the guide flow channel 224 may also extend in a non-linear line, for example, the guide flow channel 224 extends along an S-shaped line or a spiral line.

In some embodiments, in the winding direction A, a spacing between every two adjacent first guide flow through holes 2215 in the positive electrode plate 221 may gradually increases; and a spacing between every two adjacent second guide flow through holes 2223 in the negative electrode plate 222 may also gradually increases.

Optionally, the extension direction of the guide flow channel 224 is perpendicular to the axial direction B of the winding structure (refer to FIG. 4). This structure may shorten the flow path of the electrolyte and the gas, and may effectively improve the electrolyte infiltration efficiency and the gas exhaust efficiency.

Figure 13:
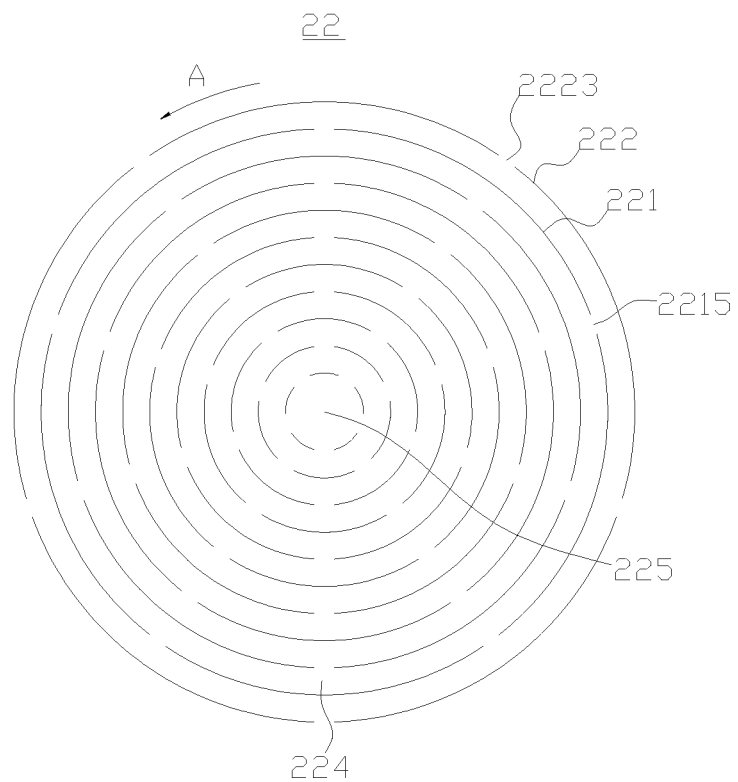
FIG. 13 is a schematic structural diagram of an electrode assembly provided by other embodiments of the present application.

It should be noted that, it may be seen from some of the above embodiments, as shown in FIG. 12, the guide flow channel 224 in the winding structure may extend along a straight line, so that the first guide flow through hole 2215 aligns with the adjacent second guide flow through hole 2223. In other embodiments, please refer to FIG. 13. FIG. 13 is a schematic structural diagram of an electrode assembly 22 provided by other embodiments of the present application. In the guide flow channel 224, the first guide flow through hole 2215 may also be staggered with the adjacent second guide flow through hole 2223; and the staggered first guide flow through hole 2215 and the second guide flow through hole 2223 are connected through a gap between electrode plates of adjacent two rings.

Figure 14:
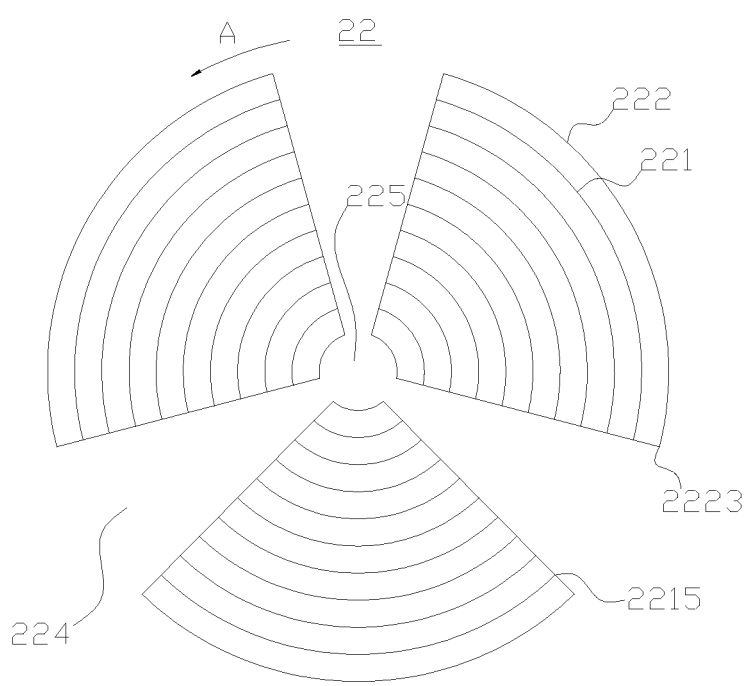
FIG. 14 is a schematic structural diagram of an electrode assembly provided by some other embodiments of the present application.

In some embodiments, please refer to FIG. 14. FIG. 14 is a schematic structural diagram of an electrode assembly 22 provided by some other embodiments of the present application. The guide flow channel 224 includes a plurality of guide flow through holes distributed at intervals along its extension direction, and the plurality of guide flow through holes includes a plurality of the first guide flow through holes 2215 and a plurality of the second guide flow through holes 2223; that is, a part of flow through holes in the plurality of guide flow channel 224 is the first guide flow through hole 2215, and a part of flow through holes is the second guide flow through hole 2223. In the direction in which the guide flow channel 224 extends to the inside of the winding structure, an aperture of each guide flow through hole in the guide flow channel 224 gradually reduces.

In the winding structure, from the electrode plate of the innermost ring to the electrode plate of the outermost ring, a circumference of the electrode plate of each ring gradually increases, and the requirements for electrolyte infiltration also gradually increase. In the direction in which the guide flow channel 224 extends to the inside of the winding structure, the aperture of each guide flow through hole in the guide flow channel 224 gradually reduces. On one hand, it may meet requirements that the electrode plate of the inner ring has a small infiltration requirement for the electrolyte, and the electrode plate of the outer ring has a great requirement for the electrolyte.

In the present embodiment, in the direction in which the guide flow channel 224 extends to the inside of the winding structure, the aperture of each guide flow through hole in the guide flow channel 224 gradually reduces, so that the entire guide flow channel 224 has a conical structure with a large outer end and a small inner end. Among that, the inner end of the guide flow channel 224 is closer to the central position of the winding structure than the outer end.

Figure 15:
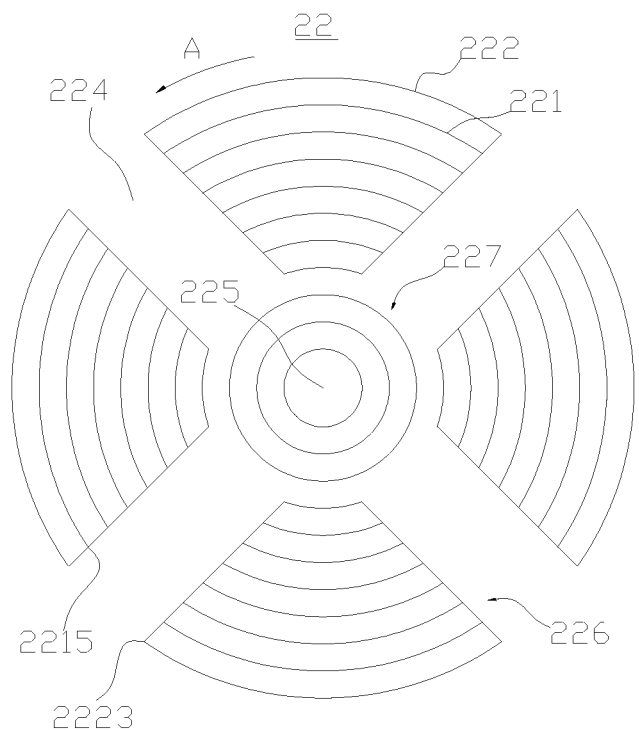
FIG. 15 is a schematic structural diagram of an electrode assembly provided by some other embodiments of the present application.

In some embodiments, please refer to FIG. 15. FIG. 15 is schematic structural diagram of an electrode assembly 22 provided by some other embodiments of the present application. The winding structure includes an outer ring portion 226 and an inner ring portion 227 that are concentrically provided, and the inner ring portion 227 is located inside the outer ring portion 226. The first guide flow through hole 2215 is provided in the positive electrode plate 221 in the outer ring portion 226, the second guide flow through hole 2223 is provided in the negative electrode plate 222 in the outer ring portion 226, and the guide flow channel 224 is formed in the outer ring portion 226.

The electrolyte may enter the inside of the winding structure through the guide flow channel 224, to infiltrate the electrode plate in the outer ring portion 226.

The first guide flow through hole 2215 and the second guide flow through hole 2223 are provided in the positive electrode plate 221 and the negative electrode plate 222 in the outer ring portion 226, respectively. The positive electrode plate 221 in the inner ring portion 227 is not provided with the first guide flow through hole 2215, and the negative electrode plate 222 in the inner ring portion 227 is not provided with the second guide flow through hole 2223, that is, the electrode plates in the inner ring portion 227 are not punctured, which may effectively reduce the production cost and has better economy.

Illustratively, the number of rings of electrode plates in the inner ring portion 227 is smaller than the number of rings of electrode plates in the outer ring portion 226. The number of rings of electrode plates in the inner ring portion 227 may be 1-5 rings. An aperture of the first guide flow through hole 2215 on the positive electrode plate 221 in the outer ring portion 226 is equal to an aperture of the second guide flow through hole 2223 on the negative electrode plate 222 in the outer ring portion 226.

The aperture of the first guide flow through hole 2215 and the aperture of the second guide flow through hole 2223 in the outer ring portion 226 may both be greater than a diameter of the electrode plate of the outermost ring in the inner ring portion 227, or may both be smaller than the diameter of the electrode plate of the outermost ring in the inner ring portion 227.

Figure 16:
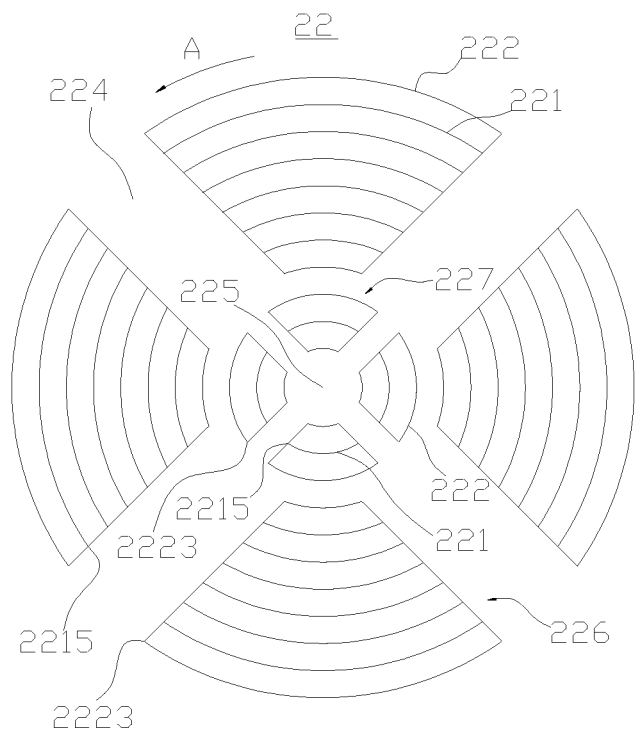
FIG. 16 is a schematic structural diagram of an electrode assembly provided by some other embodiments of the present application.

In some embodiments, please refer to FIG. 16. FIG. 16 is a schematic structural diagram of an electrode assembly 22 provided by some other embodiments of the present application. The winding structure includes an outer ring portion 226 and an inner ring portion 227 that are concentrically provided, and the inner ring portion 227 is located inside the outer ring portion 226. The positive electrode plates 221 in the outer ring portion 226 and the inner ring portion 227 are both provided with the first guide flow through holes 2215, and the negative electrode plates 222 in the outer ring portion 226 and the inner ring portion 227 are both provided with the second guide flow through holes 2223, and the guide flow channel 224 is formed in the outer ring portion 226 and the inner ring portion 227. An aperture of the first guide flow through hole 2215 in the inner ring portion 227 is smaller than an aperture of the first guide flow through hole 2215 in the outer ring portion 226, and an aperture of the second guide flow through hole 2223 in the inner ring portion 227 is smaller than an aperture of the second guide flow through hole 2223 in the outer ring portion 226. This structure makes the apertures of the guide flow through hole on the electrode plate in the outer ring portion 226 is relatively large, and the guide flow through hole on the electrode plate in the inner ring portion 227 is relatively small. The aperture of the flow through hole on the electrode plate in the outer ring portion 226 is relatively large, so that the electrolyte outside the winding structure may quickly enter the inside of the electrode assembly 22 through the guide flow through hole on the electrode plate in the outer ring portion 226; and the guide flow through hole on the electrode plate in the inner ring portion 227 is relatively small, which facilitates providing the guide flow through hole on the electrode plate in the inner ring portion 227.

Illustratively, the number of rings of electrode plates in the inner ring portion 227 is smaller than the number of rings of electrode plates in the outer ring portion 226. The number of rings of electrode plates in the inner ring portion 227 may be 1-5 rings. An aperture of the first guide flow through hole 2215 on the positive electrode plate 221 in the outer ring portion 226 is equal to an aperture of the second guide flow through hole 2223 on the negative electrode plate 222 in the outer ring portion 226. An aperture of the first guide flow through hole 2215 on the positive electrode plate 221 in the inner ring portion 227 is equal to the aperture of the second guide flow through hole 2223 on the negative electrode plate 222 in the inner ring portion 227.

The aperture of the first guide flow through hole 2215 and the aperture of the second guide flow through hole 2223 in the outer ring portion 226 may both be greater than a diameter of the electrode plate of the outermost ring in the inner ring portion 227, or may both be smaller than the diameter of the electrode plate of the outermost ring in the inner ring portion 227.

Figure 17:
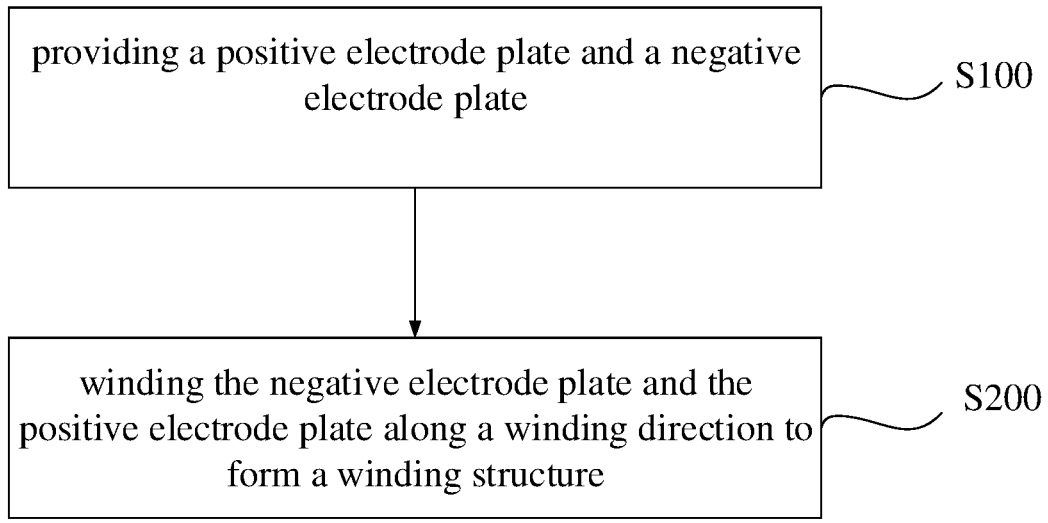
FIG. 17 is a flowchart of an electrode assembly manufacturing method provided by some embodiments of the present application.

Please refer to FIG. 17. FIG. 17 is a flowchart of a manufacturing method for an electrode assembly 22 provided by some embodiments of the present application. The manufacturing method for the electrode assembly 22 includes:

S100: providing a positive electrode plate 221 and a negative electrode plate 222;

S200: winding the negative electrode plate 222 and the positive electrode plate 221 along a winding direction A to form a winding structure;

where, the positive electrode plate 221 includes a plurality of first active substance layer regions 2213 and at least one first inactive substance layer region 2214; and in an axial direction B of the winding structure, the first inactive substance layer region 2214 is located between two adjacent first active substance layer regions 2213. The first inactive substance layer region 2214 is provided with a first guide flow through hole 2215, and the first guide flow through hole 2215 is configured to penetrate both sides in a thickness direction of the positive electrode plate 221.

In some embodiments, a separator 223 for separating the positive electrode plate 221 and the negative electrode plate 222 is also provided; and the positive electrode plate 221, the separator 223, and the negative electrode plate 222 are wound along the winding direction A to form a winding structure.

It should be noted that, for the related structure of the electrode assembly 22 manufactured by the above manufacturing method, please refer to the electrode assembly 22 provided in the above respective embodiment.

Figure 18:
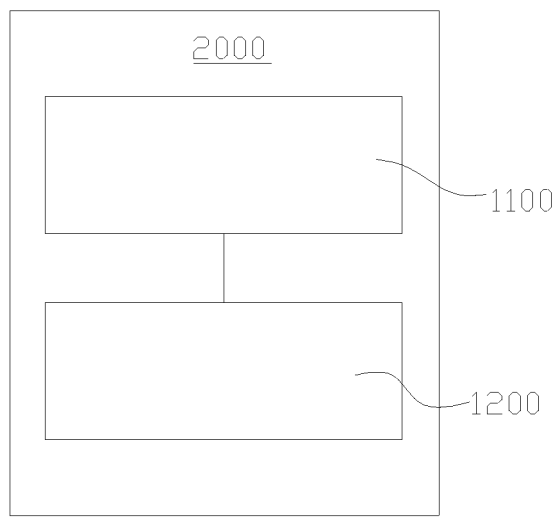
FIG. 18 is a schematic block diagram of an electrode assembly manufacturing device provided by some embodiments of the present application.

Please refer to FIG. 18. FIG. 18 is a schematic block diagram of a manufacturing device 2000 for an electrode assembly 22 provided by some embodiments of the present application. The manufacturing device 2000 includes a providing apparatus 1100 and an assembly apparatus 1200. The providing apparatus 1100 is used to provide a positive electrode plate 221 and the negative electrode plate 222, and the assembly apparatus 1200 is used to wind the negative electrode plate 222 and the positive electrode plate 221 along the winding direction A to form a winding structure.

where, the positive electrode plate 221 includes a plurality of first active substance layer regions 2213 and at least one first inactive substance layer region 2214; and in an axial direction B of the winding structure, the first inactive substance layer region 2214 is located between two adjacent first active substance layer regions 2213. The first inactive substance layer region 2214 is provided with a first guide flow through hole 2215, and the first guide flow through hole 2215 is configured to penetrate both sides in a thickness direction of the positive electrode plate 221.

In some embodiments, the providing apparatus 1100 is also used to provide a separator 223 that separates the positive electrode plate 221 and the negative electrode plate 222. The assembly apparatus 1200 is used to wind the positive electrode plate 221, the separator 223 and the negative electrode plate 222 along the winding direction A to form a winding structure.

It should be noted that for the related structure of the electrode assembly 22 manufactured by the above manufacturing device 2000, please refer to the electrode assembly 22 provided in the above respective embodiments.

The above embodiments are merely used to illustrate the technical solution of the present application, but are not intended to limit the present application. For those skilled in the art, the present application may have various amendments and modifications. Any modification, equivalent substitution, improvement etc, made within the spirit and principle of the present application shall fall within the protection scope of the present application.

What is claimed is:

1. An electrode assembly, comprising a positive electrode plate and a negative electrode plate, the positive electrode plate and the negative electrode plate being wound along a winding direction to form a winding structure;

the positive electrode plate comprising a plurality of first active substance layer regions and at least one first inactive substance layer region; in an axial direction of the winding structure, the first inactive substance layer region being located between two adjacent first active substance layer regions;

wherein the first inactive substance layer region is provided with a first guide flow through hole, and the first guide flow through hole is configured to penetrate both sides in a thickness direction of the positive electrode plate;

wherein the negative electrode plate is provided with a second guide flow through hole, and the second guide flow through hole is configured to penetrate both sides in a thickness direction of the negative electrode plate;

the winding structure is provided with a guide flow channel that allows an electrolyte to flow from the outside of the winding structure to the inside of the winding structure;

a plurality of the first guide flow through holes and a plurality of the second guide flow through holes form the guide flow channel;

wherein the winding structure comprises an outer ring portion and an inner ring portion that are concentrically provided, and the inner ring portion is located inside the outer ring portion; the first guide flow through hole is provided in the positive electrode plate in the outer ring portion, the second guide flow through hole is provided in the negative electrode plate in the outer ring portion, and the guide flow channel is formed in the outer ring portion; or, the winding structure comprises an outer ring portion and an inner ring portion that are concentrically provided, and the inner ring portion is located inside the outer ring portion; the positive electrode plates in the outer ring portion and the inner ring portion are both provided with the first guide flow through holes, and the negative electrode plates in the outer ring portion and the inner ring portion are both provided with the second guide flow through holes, the guide flow channel is formed in the outer ring portion and the inner ring portion; wherein, an aperture of the first guide flow through hole in the inner ring portion is smaller than an aperture of the first guide flow through hole in the outer ring portion, and an aperture of the second guide flow through hole in the inner ring portion is smaller than an aperture of the second guide flow through hole in the outer ring portion.

2. The electrode assembly according to claim 1, wherein the first inactive substance layer region is provided with a plurality of the first guide flow through holes distributed at intervals along the winding direction.

3. The electrode assembly according to claim 2, wherein in the winding direction, a spacing between every two adjacent first guide flow through holes gradually increases; or, in the winding direction, the spacing between every two adjacent first guide flow through holes is equal.

4. The electrode assembly according to claim 1, wherein the negative electrode plate comprises a second active substance layer region, the second guide flow through hole is provided in the second active substance layer region, and the first active substance layer region and the first inactive substance layer region are both provided opposite to the second active substance layer region.

5. The electrode assembly according to claim 1, wherein the negative electrode plate comprises a plurality of second active substance layer regions and at least one second inactive substance layer region; and in the axial direction, the second inactive substance layer region is located between two adjacent second active substance layer regions, and the second guide flow through hole is provided in the second inactive substance layer region;
wherein, the second active substance layer region is provided opposite to the first active substance layer region, the second inactive substance layer region is provided opposite to the first inactive substance layer region, and a width of the second inactive substance layer region in the axial direction does not exceed a width of the first inactive substance layer region in the axial direction.

6. The electrode assembly according to claim 1, wherein the negative electrode plate is provided with a plurality of the second guide flow through holes distributed at intervals along the winding direction.

7. The electrode assembly according to claim 6, wherein in the winding direction, a spacing between every two adjacent second guide flow through holes gradually increases; or, in the winding direction, the spacing between every two adjacent second guide flow through holes is equal.

8. The electrode assembly according to claim 1, wherein the winding structure is provided with a plurality of the guide flow channels distributed at intervals along the winding direction.

9. The electrode assembly according to claim 1, wherein the guide flow channel extends along a straight line, and an extension direction of the guide flow channel is provided at a non-zero angle with the axial direction.

10. The electrode assembly according to claim 9, wherein the extension direction is perpendicular to the axial direction.

11. The electrode assembly according to claim 1, wherein the guide flow channel comprises a plurality of guide flow through holes distributed at intervals along its extension direction, and the plurality of guide flow through holes comprises a plurality of the first guide flow through holes and a plurality of the second guide flow through holes;
in the direction in which the guide flow channel extends to the inside of the winding structure, an aperture of each guide flow through hole in the guide flow channel gradually reduces; or, each aperture of guide flow through hole in the guide flow channel is equal.

12. The electrode assembly according to claim 1, wherein the inside of the winding structure is formed with a central hole extending along the axial direction, and the guide flow channel is connected to the central hole.

13. A battery cell, comprising a shell and the electrode assembly according to claim 1;
the electrode assembly being accommodated in the shell.

14. A battery, comprising a box body, and the battery cell according to claim 13;
the battery cell being accommodated in the box body.

15. A power consumption device, comprising the battery according to claim 14.

16. A manufacturing method for an electrode assembly, comprising:
providing a positive electrode plate and a negative electrode plate;
winding the negative electrode plate and the positive electrode plate along a winding direction to form a winding structure;
wherein the positive electrode plate comprises a plurality of first active substance layer regions and at least one first inactive substance layer region; in an axial direction of the winding structure, the first inactive substance layer region is located between two adjacent first active substance layer regions;
the first inactive substance layer region is provided with a first guide flow through hole, and the first guide flow through hole is configured to penetrate both sides in a thickness direction of the positive electrode plate;
wherein the negative electrode plate is provided with a second guide flow through hole, and the second guide flow through hole is configured to penetrate both sides in a thickness direction of the negative electrode plate;
the winding structure is provided with a guide flow channel that allows an electrolyte to flow from the outside of the winding structure to the inside of the winding structure;
a plurality of the first guide flow through holes and a plurality of the second guide flow through holes form the guide flow channel;
wherein the winding structure comprises an outer ring portion and an inner ring portion that are concentrically provided, and the inner ring portion is located inside the outer ring portion; the first guide flow through hole is provided in the positive electrode plate in the outer ring portion, the second guide flow through hole is provided in the negative electrode plate in the outer ring portion, and the guide flow channel is formed in the outer ring portion; or, the winding structure comprises an outer ring portion and an inner ring portion that are concentrically provided, and the inner ring portion is located inside the outer ring portion; the positive electrode plates in the outer ring portion and the inner ring portion are both provided with the first guide flow through holes, and the negative electrode plates in the outer ring portion and the inner ring portion are both provided with the second guide flow through holes, the guide flow channel is formed in the outer ring portion and the inner ring portion; wherein, an aperture of the first guide flow through hole in the inner ring portion is smaller than an aperture of the first guide flow through hole in the outer ring portion, and an aperture of the second guide flow through hole in the inner ring portion is smaller than an aperture of the second guide flow through hole in the outer ring portion.

* * * * *